(12) United States Patent
Loubet et al.

(10) Patent No.: US 9,097,807 B2
(45) Date of Patent: Aug. 4, 2015

(54) METHOD OF ANALYSING THE EFFECT OF TEMPERATURE ON AN IRRADIATED FUEL

(71) Applicant: COMMISSARIAT A L'ENERGIE ATOMIQUE ET AUX ENERGIES ALTERNATIVES, Paris (FR)

(72) Inventors: Laurent Loubet, Villelaure (FR); Brigitte LaCroix, La Tour d'Aigues (FR); Jean Noirot, Aix en Provence (FR); Thierry Martella, Meyrargues (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/452,154

(22) Filed: Aug. 5, 2014

(65) Prior Publication Data
US 2015/0041669 A1    Feb. 12, 2015

(30) Foreign Application Priority Data
Aug. 7, 2013 (FR) ...................................... 13 57866

(51) Int. Cl.
*G01J 1/42* (2006.01)
*G01T 1/178* (2006.01)
*G21C 17/06* (2006.01)

(52) U.S. Cl.
CPC ............... *G01T 1/178* (2013.01); *G21C 17/06* (2013.01)

(58) Field of Classification Search
CPC .............................. G21C 3/3315; Y02E 30/40
USPC ......................................................... 250/395
See application file for complete search history.

(56) References Cited

U.S. PATENT DOCUMENTS 5,375,155 A * 12/1994 Friedrich ....................... 376/446
8,700,359 B2 * 4/2014 Au et al. ........................ 702/189

FOREIGN PATENT DOCUMENTS

EP          2442312 A1    4/2012

OTHER PUBLICATIONS

S. Bejaoui, et al., "ECRIX-H Experiment: Post-Irrradiation Examinationas and Simulations": URL:https://www.oecd-nea.org/pt/iemptll/poster/III-1.pdf, 2012, pp. 1-10, XP055108850.
C.N. Venkiteswaran, et al., "Irradiation Behavior of FBTR Mixed Carbide Fuel at Various Burn-Ups", Energy Procedia, 2011, pp. 227-233, vol. 7, XP028269343.

* cited by examiner

*Primary Examiner* — Kiho Kim
(74) *Attorney, Agent, or Firm* — Baker & Hostetler LLP

(57) ABSTRACT

A method for analysing the effect of temperature on at least one nuclear fuel rod, a rod comprising packed zones completely filled with fuel and intermediate zones partially filled with fuel, comprises: acquiring at least two count profiles, a first count profile being associated with a non-migrating isotope and a second count profile being associated with a migrating isotope; locating the intermediate zones by using the first count profile; determining an indicator $K_{i\_1}$ indicative of the depth in the first profile of a measurement dip located at an intermediate zone i; determining an indicator $K_{i\_2}$ indicative of the depth in the second profile of a measurement dip located at the intermediate zone i; determining for this intermediate zone i an indicator $\Delta i$ by comparing the indicators $K_{i\_1}$ and $K_{i\_2}$.

10 Claims, 3 Drawing Sheets

METHOD OF ANALYSING THE EFFECT OF TEMPERATURE ON AN IRRADIATED FUEL

CROSS-REFERENCE TO RELATED APPLICATION

This application claims priority to foreign French patent application No. FR 1357866, filed on Aug. 7, 2013, the disclosure of which is incorporated by reference in its entirety.

FIELD OF THE INVENTION

The invention relates to a method for analysing the effect of temperature on an irradiated fuel and applies to the field of the analysis of radioactive fuel, more particularly to the analysis thereof using gamma-ray spectrometry.

BACKGROUND

The fuel used in nuclear power stations changes over time as it is used. It is commonplace for this change to be analysed and, in order to do so, fuel elements are removed then evaluated in laboratories equipped with enclosures suited to reducing exposure to radiation, for example using thick lead walls. These enclosures are referred to as high-activity cells or hot cells.

The fuel analysed usually takes the form of an irradiated fuel rod. Tools and methods have been developed over the years for studying these.

The evaluations carried out in the hot cells may be destructive, physical intervention on the rod then being required. By way of example, the rod may therefore be cut into sections for this type of evaluation.

Alternatively, evaluations known as non-destructive evaluations and denoted by the abbreviation NDE may also be carried out. In that case, the geometry of the rod remains unaltered. Non-destructive evaluations can be carried out by measuring the radiation emitted by the isotopes resulting from the fission of a fuel such as uranium-235, denoted U-235 throughout the rest of the description. By way of example, gamma-ray spectrometry, the principle of which is to identify radioactive elements by measuring the energy of the gamma radiation (photons) emitted, provides damage-free access to information directly connected with the fuel contained in the rod.

With knowledge of the gamma spectral lines of the isotopes that are to be studied it is possible to take measurements per region of interest in order to obtain a surface in measurement steps and by isotope. The distribution of the fission products created by the irradiation and visible in gamma-ray spectrometry provides direct access to the features of the fuel stack, such as the start of the stack and the end of the stack and provides information regarding the irradiation. In this description, the expression "fuel stack" denotes a collection of at least two pellets which are aligned and placed one behind the other. A rod is an assembly made up of a fuel stack, of a cladding comprising the said stack and of two end plugs, one at each end of the cladding.

Rods for pressurised water reactors, referred to as PWR rods, are made up of a cylindrical cladding containing a plurality of fuel pellets positioned one after another longitudinally inside the said cladding. The pellets are of cylindrical shape and have a length of the order of one centimetre. At their ends they have chamfers and cavities (usually denoted by the English word "dishing"), one of the purposes of this being to allow them to absorb deformations.

The special geometry of the pellets leads to reductions in the material at their ends. The result of this is that the gamma count rates for the fission products around these zones are lower. This variation in the count rate thus makes it possible to distinguish the pellets from one another.

To complement this, these qualitative spectrometry measurements can be supplemented by quantitative analyses. Thus, information such as the number of caesium-137 (Cs-137) atoms per pellet makes it possible to estimate the rate of combustion per pellet.

Multi-channel analysers are usually employed for analysing the gamma spectrum. These analysers have as output data histograms made up of several channels. One histogram channel j corresponds for example to one energy band $B_j$. The quantities to be measured pertaining to the gamma photons are classified by channels according to their energy level. The set of channels j indicative of a spectrum make up a histogram.

The quantity measured for a channel j corresponds to a number of events measured in a given time, also known as counts. For each channel, the counts measured are counted up, making it possible to determine the value associated with the said channels.

The counts correspond to measurements indicative of interactions between the particles that are to be measured and the sensor used, for example the germanium crystal. In other words, when a particle is detected by the sensor, a count is counted. The histogram is usually represented with the energy level along the abscissa axis and the number of counts on the ordinate axis (in which case it gives a "count") or as a number of counts per second (which then gives a count rate).

Non-destructive NDE evaluations of irradiated fuel rods using gamma-ray spectrometry notably make it possible to locate the zones separating two adjacent pellets, these zones being referred to in the remainder of the description as inter-pellet zones. However, there is a need to know the histories behind the temperatures experienced by the fuel pellets during their cycle in the reactor in order to connect the post-irradiation results to these histories and further the understanding of the phenomena that occur in a reactor. The objective of gaining this knowledge is notably to improve the methods of manufacture of these fuels, pellets and rods, to better control the reactor or even manage accidents.

Now, these evaluation methods do not allow the effect the temperature has on the rods to be analysed specifically, i.e. does not allow the zones of the rod that have been heated up to be both identified and quantified.

One of the objects of the invention is to address these insufficiencies of the prior art and to make improvements thereto.

SUMMARY OF THE INVENTION

To this end, the subject of the invention is a method for analysing the effect of temperature on at least one nuclear fuel rod, a rod comprising packed zones completely filled with fuel and intermediate zones partially filled with fuel. The method comprises the following steps:
 acquiring at least two count profiles, a first count profile being associated with a non-migrating isotope and a second count profile being associated with a migrating isotope, the said profiles being made up spectrometry measurements taken along the rod for these isotopes;
 locating the intermediate zones by using the first count profile;

determining an indicator $K_{i\_1}$ indicative of the depth in the first profile of a measurement dip located at an intermediate zone i;

determining an indicator $K_{i\_2}$ indicative of the depth in the second profile of a measurement dip located at the intermediate zone i;

determining for this intermediate zone i an indicator $\Delta i$ by comparing the indicators $K_{i\_1}$ and $K_{i\_2}$, the value of the indicator $\Delta i$ being indicative of the intensity of heating experienced by the rod as it burns.

According to one aspect of the invention, the rod is a rod or a section of rod of PWR type made up of a plurality of pellets, an intermediate zone corresponding to an inter-pellet zone and the indicators $K_{i\_1}$ and $K_{i\_2}$ being indicative of the depth within their respective profiles of a measurement dip located at the intermediate zone i.

In one embodiment, a value $K\_1$ corresponding to a mean of the indicators $K_{i\_1}$ determined for a plurality of intermediate zones is determined, the indicator $\Delta i$ being determined by comparing $K\_1$ with $K_{i\_2}$.

In one embodiment, the indicator $K_{i\_1}$ and/or $K_{i\_2}$ is determined by comparing a theoretical value $T_i$ with a value located at the intermediate zone i and belonging to the measurement profile associated with this indicator, the said theoretical value $T_i$ being chosen so that it ensures continuity of counting between the zones of the profile corresponding to the packed zones of the rod which are situated on either side of the intermediate zone i.

According to one aspect of the invention, the theoretical value $T_i$ is obtained by extrapolating the measurements corresponding to the packed zones of the rod which are situated on either side of the intermediate zone i.

The indicator $\Delta i$ is, for example, equal to the difference $K_{i\_1} - K_{i\_2}$.

The non-migrating isotope of the first count profile is, for example, Ru-106.

The migrating isotope of the second count profile is, for example, Cs-137.

Another subject of the invention is a system for analysing at least one nuclear fuel rod comprising a gamma-ray spectrometry device and a processing unit implementing the method described hereinabove.

Another subject of the invention is a computer program containing instructions for executing the method described hereinabove, when the program is executed by a processor.

BRIEF DESCRIPTION OF THE DRAWINGS

Other features and advantages of the invention will become apparent through the description which follows by way of nonlimiting illustration, given with reference to the attached drawings among which.

DETAILED DESCRIPTION

Figure 1:
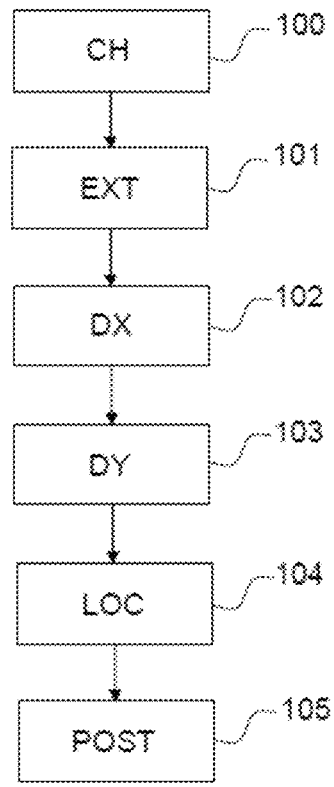
FIG. 1 gives an example of a method that allows inter-pellet zones in a rod to be located.

FIG. 1 gives a simplified example of a method that allows the inter-pellet zones to be located in a PWR rod or rod section.

The measurements acquired by gamma-ray spectrometry allow a full spectrum to be obtained for each measurement step. The rod studied can be moved transversely to the measurement device used, so that the said device can measure the entire fuel stack. The reverse is also possible. In that case, it is the device that moves. This device uses a measurement window with a size usually of the order of one millimetre through which the gamma radiation of the photons is measured. For each measurement point, the clearly defined surfaces per region of interest are calculated for example for around fifteen isotopes, and the total count of all energies. That makes it possible to plot the distributions of count rate by isotope. It is also possible to plot the distribution of the total count along a fuel stack. These distributions are referred to in the remainder of the description as "count profiles".

A succession of steps can then be carried out in order to locate the inter-pellet zones. That notably makes it possible to count and study the change in shape of the pellets during combustion (i.e. during their cycle in reactor).

A first step 100 selects a count profile associated with a given isotope. This profile needs to be exploitable, i.e. it needs to correspond to a distribution that displays good characteristics in statistical terms.

A second step 101 is aimed at eliminating the end zone of the stack to be processed.

A third step 102 corresponds to the selection of an axial range DX aligned with the fuel stack and expressed in millimeters. A rolling mean of the count rates is calculated over this axial range. By way of example, DX=5 mm.

A fourth step 103 corresponds to the selection of a detection threshold DY. This threshold allows the pellet zones to be discriminated. If the count at a point x differs from the rolling mean calculated for this point by more than DY percent then the point is considered to belong to an inter-pellet zone. By way of example, DY=5%.

A fifth step 104 acquires the location of the pellets found, i.e. the start distance and the end distance for each of them.

A sixth step 105 can be run as an option in order to manually join together two zones which would not have been considered to belong to the same pellet even though the lengths of the fragments situated on either side of an inter-pellet zone are significantly shorter or longer than the expected length (and vice versa).

Figure 2:
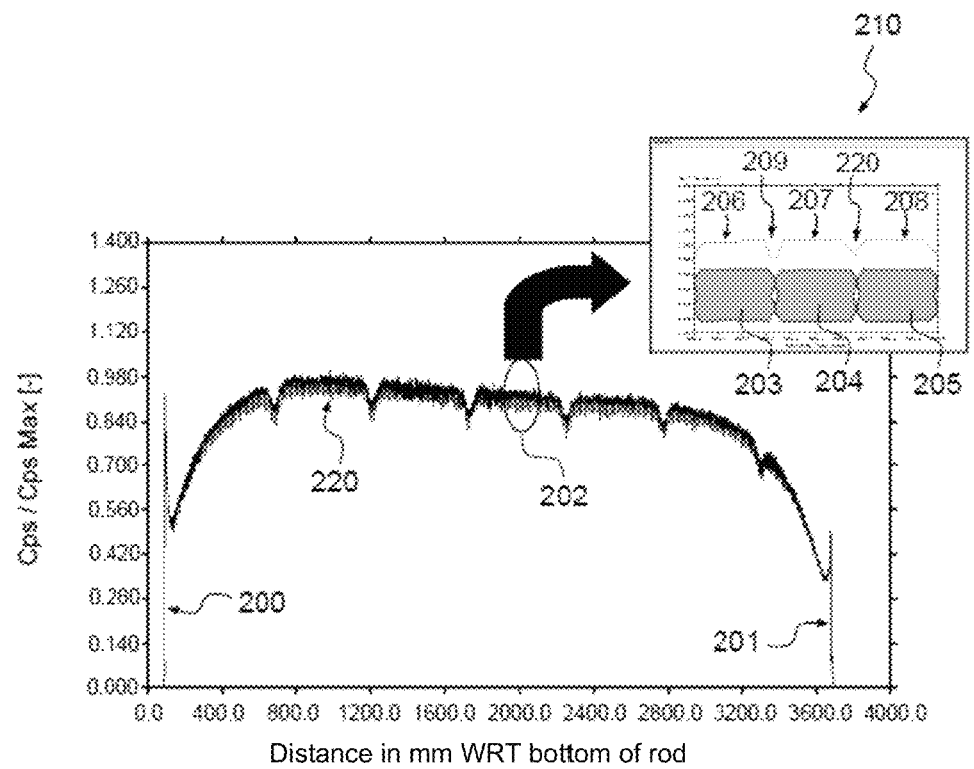
FIG. 2 depicts a Cs-137 count curve measured by gamma-ray spectrometry on a fuel stack made up of a plurality of pellets.

FIG. 2 depicts a Cs-137 count curve measured by gamma-ray spectrometry on a fuel stack made up of a plurality of PWR pellets. The abscissa axis indicates the distance in millimeters, i.e. the location of the various measurement points. The number of normalised counts (counts over max counts) measured is given on the ordinate axis.

As mentioned previously, observing the radiation of a fission product using gamma-ray spectrometry provides direct access to the features of the fuel stack. In this example, the radiation of Cs-137 has been observed, this observation making it possible to locate the start of the stack 200 and the end of the stack 201. Furthermore, in this example, the particular geometry of the pellets contained in PWR rods leads to reductions in material at their ends. Thus, the gamma count rate for the fission products is lower at the inter-pellet zones making it possible to distinguish the position of the pellets relative to one another. A zone 202 of the measured curve has been enlarged 210. This zone corresponds to a length of three pellets 203, 204, 205. The measured count rate curve shows three plateaus 206, 207, 208 corresponding to the packed pellet parts. Moreover, two dips 209, 220 appear and correspond to the inter-pellet zones. It is thus possible, by analysing the curve obtained, to study the geometry of the fuel stack and, where appropriate, the geometry of the pellets of which it is composed. It is then possible to count the pellets, check the manufacture of the rods and monitor the elongation of the rod following irradiation thereof. The method set out in FIG. 1 can be used for that.

Figure 3:
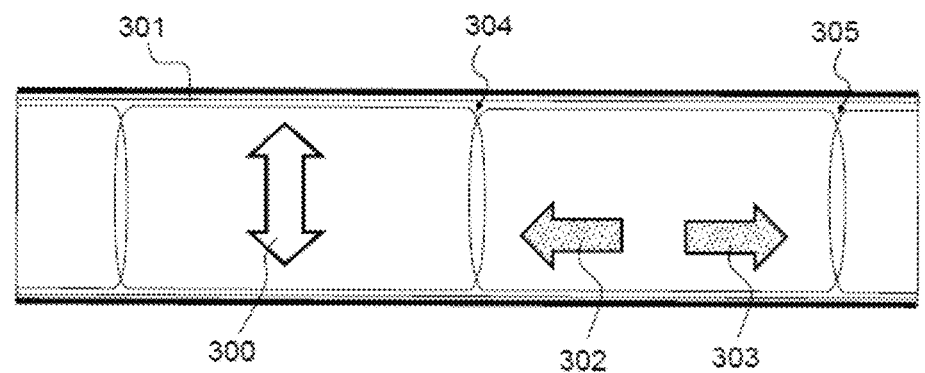
FIG. 3 illustrates the phenomenon of isotope migration.

FIG. 3 illustrates the phenomenon of isotope migration. With the increase in the number and variety of fuel rods processed in hot cells, a phenomenon that is referred to as migration could be observed from the gamma-ray spectrometry measurements. This phenomenon has been observed notably on Cs-137 and Cs-134. It should be noted that this isotope can be produced by direct fission of U-235 or by de-excitation of Xenon-137 (Xe-137).

In the event of a rise in temperature, the caesium migration phenomenon will occur. Indeed, for PWR fuels, upwards of a temperature of the order of one thousand two hundred (1200) degrees Celsius, caesium moves in the opposite direction to the temperature gradient. Thus the volatile fission products will move in two ways. Movement may take place radially 300, i.e. from the centre of the pellet towards the cladding 301, or alternatively axially 302, 303, i.e. from the centre of the pellet towards the inter-pellet zones 304, 305.

As explained previously, the fuel pellets of a PWR rod have dished ends. This dishing leads to a reduction in the material spaced evenly along the fuel stack. These inter-pellet zones are therefore visible in spectrometry because they result in reductions in the count rates. Now, in certain cases, and for certain isotopes such as those of caesium, the reduction in the count rates expected in the inter-pellet zone is not very visible. This is because caesium may have a migratory behaviour. Such a change in the appearance of the count profiles for these isotopes is a sign of axial migration of caesium in the inter-pellet zones.

In the context of existing qualitative spectrometry techniques, it is possible to indicate that axial migration has probably occurred when the reduction in the count rate in the inter-pellet zones changes or does not have the expected value. By way of example, migration of Cs-137 to the ends of the pellets results in the caesium content of the pellet being impoverished at the centre and increased at the end.

Figure 4:
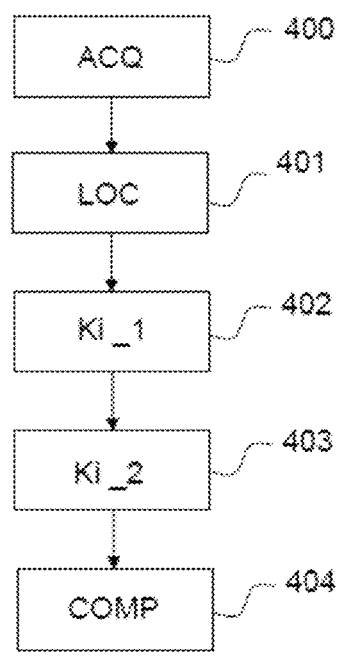
FIG. 4 illustrates in a simplified manner the principle behind the method for measuring and quantifying the migration of isotopes according to the invention.

FIG. 4 illustrates in a simplified manner the principle of the method for measuring and quantifying the migration of isotopes according to the invention. This method is described for measuring rods.

In a first phase 400, gamma spectrum measurements are taken along a fuel rod or a fuel stack comprising several pellets with a measurement step chosen beforehand. The result of these measurements corresponds to a collection of gamma spectra, one spectrum being obtained for each measurement step. Two measurement profiles are extracted from these gamma spectra. A first profile is determined for a non-migrating isotope and a second profile is determined for a migrating isotope.

A non-migrating isotope is an isotope that remains where it was produced at the time of fission, regardless of the temperature at which the fuel has been exposed. Ruthenium-106 (Ru-106) can be used as a non-migrating isotope but other non-migrating isotopes may also be used for that, such as Zr-95, Eu-154 or Rh-103.

By contrast, a migrating isotope is an isotope, the position of which varies as a function of fuel temperature. Caesium-137 (Cs-137) can be used within the context of the method described, but other migrating isotopes may also be used for that, such as Cs-134.

These two profiles are respectively the result of the extraction of measurements for all of the gamma spectra measured for the isotope with which they are associated.

A second step 401 is carried out in order to locate the intermediate zones and thus differentiate them from the packed zones. A zone of a rod is said to be packed when it is completely full of material and an intermediate zone is a zone of a rod that is not completely packed with material. An intermediate zone therefore corresponds to an inter-pellet zone or alternatively to a zone corresponding to the end of a rod.

By way of example, an intermediate zone between two pellets of a PWR rod contains of the order of ten percent less material than a packed zone. Such a zone is also referred to as an inter-pellet zone. In the remainder of the description, it is inter-pellet zones that are of interest but the invention may be applied to other intermediate zones such as the zones found at each end of the rod.

In order to locate the intermediate zones precisely, use is made of the count profile for the non-migrating isotope. Analysing the non-migrating isotope radiation measurements makes it possible to obtain a reference value that is indicative of the difference in emission of gamma radiation between a packed zone and an intermediate zone. By way of example, the method described hereinabove with the aid of FIG. 1 can be used to form such an analysis.

A third step 402 has the objective of determining an indicator $Ki\_1$ that makes it possible to quantify the reduction in material at the intermediate zones located in the previous step 401. This indicator corresponds to a comparison between an interpolated value $Ti\_1$ for this zone and the value from the measurement profile for the non-migrating isotope.

The interpolated value $Ti\_1$ corresponds to a value that could have been measured on the intermediate zone had the latter been packed with material. For the next steps it is possible to use all of the values of $Ki\_1$ determined for each inter-pellet zone of index i or alternatively to determine a single value $K\_1$ for all of these zones, this single value corresponding to a mean of the values $Ki\_1$.

A fourth step 403 has the objective of determining a second indicator $Ki\_2$ associated with the intermediate zones located in the previous step 401. This indicator corresponds to a comparison between an interpolated value $Ti\_2$ obtained for these zones and the value from the measurement profile for the migrating isotope.

The indicators $Ki\_1$ and $Ki\_2$ are indicative of the depth of the count measurement dips observed in the count profiles at the intermediate zones.

The indicators $Ki\_1$ and $Ki\_2$ can be calculated in different ways and examples are given further on in the description. The values $Ti\_1$ and $Ti\_2$ mentioned for these two indicators can be determined by estimating the value of the plateaus of two adjacent pellets and then interpolating them to make these two plateaus meet, i.e. so as to have continuity in the counts which would have been observed in the absence of an intermediate zone at that point.

Next, a fifth step 404 makes a comparison between the indicators $Ki\_1$ and $Ki\_2$ respectively determined and the measurement profiles for the non-migrating isotope and for the migrating isotope. Comparing these two indices makes it possible to compare the depth of the dips in the count profile associated with the migrating isotope against the depth of the dips of the count profile associated with the non-migrating isotope. For a given intermediate zone, the greater the difference in the depths of the dips which is estimated for each count profile the more significant has been the phenomenon of migration at this point along the fuel rod or stack.

This comparison can be performed using a simple difference $\Delta = Ki\_1 - Ki\_2$ or a relative difference $(Ki\_1 - Ki\_2)/Ki\ 1$. In that case, the greater the migration, the greater the value $\Delta$. The value obtained following the comparing of the two indices makes it possible to detect that a migration has taken place but also makes it possible to discover or even quantify the magnitude of this migration. Thus, the influence the temperature has on the fuel can be analysed in fine detail. It is also possible to determine a history of the change in temperatures in a nuclear reactor.

The difference $\Delta$ may be compared against a predefined threshold value. For points of index i for which the said threshold value is not exceeded, it can be deduced that the temperature has not exceeded a given temperature associated with that threshold, for example 1200° C., without making a distinction as to the temperature the rod actually has been exposed to at that point.

For the other points for which the difference does exceed the predefined threshold value, it is considered that the temperature of the rod has reached the temperature associated with the predefined threshold value, for example 1200° C. Furthermore, the difference values may be quantified in such a way as to evaluate the time for which the temperature at these points exceeded the predefined threshold value. To do that, use may be made of a look-up table, the said table associating a difference value A with an exposure time.

Advantageously, this method makes it possible to study how the fuel changes while avoiding having to take cross sections. Thus, non-destructive evaluations can be used rather than physical interventions on the fuel. If, after all, it does prove necessary to take a section, for example to perform other analyses, the method makes it possible to determine exactly the location where the cut is to be made.

Figure 5:
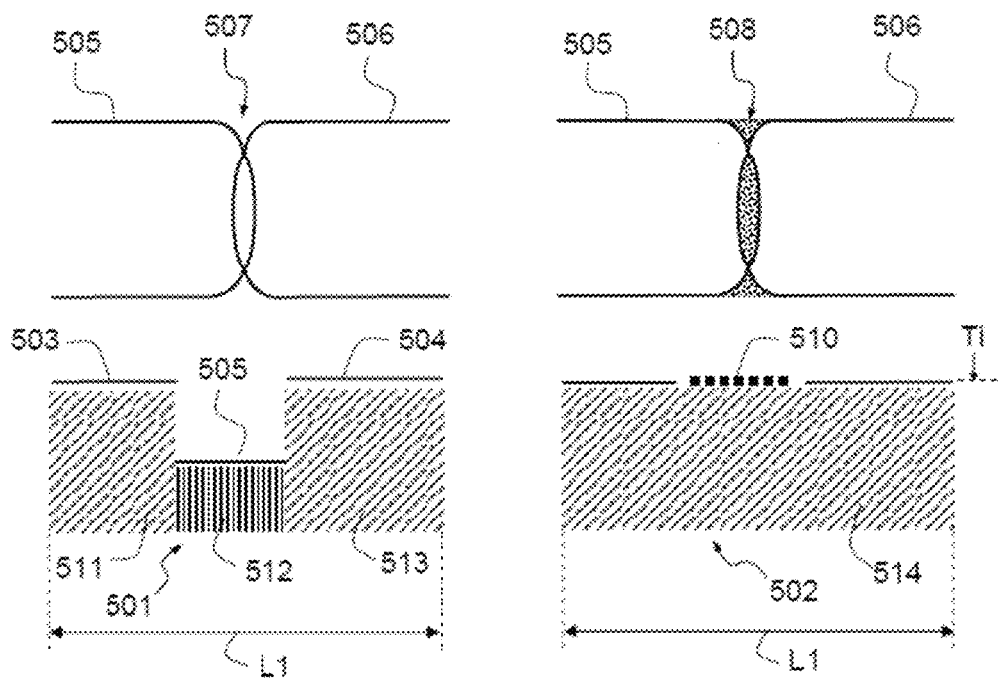
FIG. 5 gives an example of a technique that allows the indicators $K_{i\_1}$ and/or $K_{i\_2}$ to be determined.

FIG. 5 gives an example of a technique allowing for the indicators $Ki\_1$ and/or $Ki\_2$ to be determined.

The indicators $Ki\_1$ and/or $Ki\_2$ are determined for the intermediate zones identified following step 401. The principle used relies on the comparison of the count rates measured in an intermediate zone and what these count rates would have been had such a zone not been present.

FIG. 5 is a simplified graphical representation of the count rates obtained near an inter-pellet zone 507 situated between two pellets 505, 506 of a PWR rod or a rod section. A first diagram 501 shows how the measured rate changes. Two count plateaus 503, 504 correspond to packed pellet zones and a drop 505 in the count appears at the inter-pellet zone.

A second diagram 502 shows how the count rate changes after a theoretical value Ti intended to raise 510 the count rate measured in the intermediate zone has been determined. This rise is obtained for example by interpolation. Linear regression of the measurement points in the pellet zones can be used for doing this. That makes it possible to perform a realistic interpolation in the inter-pellet zone.

The objective of determining a theoretical value by raising the count measurements is to obtain a count value that could have been measured in the intermediate zone if that intermediate zone were packed 508.

The indicators $Ki\_1$ and/or $Ki\_2$ can be determined as the ratio Mi/Pi between the area Mi corresponding to the sum of the areas 511, 512 and 513 and the area Pi1 514. Mi and Pi are defined respectively by the areas under the count curves before and after raising over a width L1 chosen such that the said areas take into consideration a portion of the measurements made for the packed pellet zones. Alternatively, $Ki\_1$ and/or $Ki\_2$ can be determined using the following expression: $(Mi-Pi)/Pi$.

Figure 6:
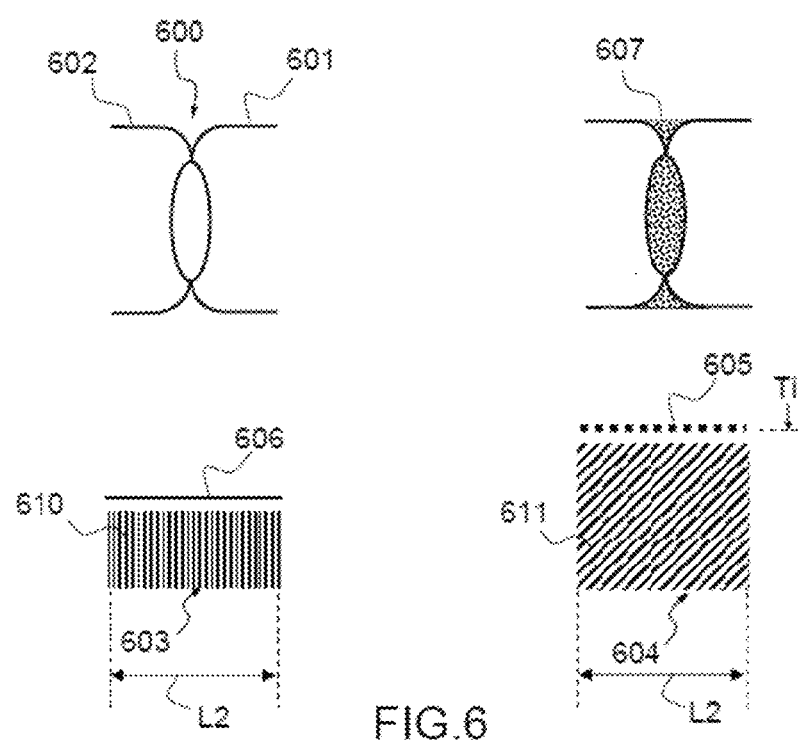
FIG. 6 gives a second example of a technique that can be used for determining the indicators $K_{i\_1}$ and/or $K_{i\_2}$.

FIG. 6 gives a second example of a technique that can be employed in order to determine the indicators $Ki\_1$ and/or $Ki\_2$.

For this alternative, the principle used relies on the comparison between the count rates measured in an intermediate zone and what these count rates would have been had such a zone not been present. In contrast with the technique set out in FIG. 5, the measurements taken in the packed zones are not taken into consideration. FIG. 6 schematically illustrates the count rate obtained at an inter-pellet zone 600 situated between two pellets 601, 602 of a PWR rod or a rod section. A first diagram 603 represents the count rate 606 measured in the intermediate zone. A second diagram 604 represents how the count rate changes after a theoretical value intended to raise 605 the count rate measured in the intermediate zone so as to obtain a count value that could have been measured in the intermediate zone if the latter had been packed 607 has been determined.

The indicators $Ki\_1$ and/or $Ki\_2$ are obtained by determining the ratio between the sum of the areas 610 and 611, the said areas corresponding to the areas respectively under the count curves obtained before and after raising over a width L2, the said width being chosen such that the areas selected do not take into consideration the measurements made for the packed pellet zones.

The invention claimed is:

1. A method for analysing the effect of temperature on at least one nuclear fuel rod, a rod comprising packed zones completely filled with fuel and intermediate zones partially filled with fuel, the method comprising the following steps:
   acquiring at least two count profiles, a first count profile being associated with a non-migrating isotope and a second count profile being associated with a migrating isotope, the said profiles being made up spectrometry measurements taken along the rod for these isotopes;
   locating the intermediate zones by using the first count profile;
   determining an indicator $Ki\_1$ indicative of the depth in the first profile of a measurement dip located at an inter-mediate zone i;
   determining an indicator $Ki\_2$ indicative of the depth in the second profile of a measurement dip located at the intermediate zone i;
   determining for this intermediate zone i an indicator $\Delta i$ by comparing the indicators $Ki\_1$ and $Ki\_2$, the value of the indicator $\Delta i$ being indicative of the intensity of heating experienced by the rod as it burns.

2. The method according to claim 1, in which the rod is a rod or a section of rod of PWR type made up of a plurality of pellets, an intermediate zone corresponding to an inter-pellet zone and the indicators $Ki\_1$ and $Ki\_2$ being indicative of the depth within their respective profiles of a measurement dip located at the intermediate zone i.

3. The method according to claim 1, in which a value $K\_1$ corresponding to a mean of the indicators $Ki\_1$ determined for a plurality of intermediate zones is determined, the indicator $\Delta i$ being determined by comparing $K\_1$ with $Ki\_2$.

4. The method according to claim 1, in which the indicator $Ki\_1$ and/or $Ki\_2$ is determined by comparing a theoretical value Ti with a value located at the intermediate zone i and belonging to the measurement profile associated with this indicator, the said theoretical value Ti being chosen so that it ensures continuity of counting between the zones of the profile corresponding to the packed zones of the rod which are situated on either side of the intermediate zone i.

5. The method according to claim 4, in which the theoretical value Ti is obtained by extrapolating the measurements corresponding to the packed zones of the rod which are situated on either side of the intermediate zone i.

6. The method according to claim 1, in which the indicator $\Delta i$ is equal to the difference $K_{i\_1} - K_{i\_2}$.

7. The method according to claim 1, in which the non-migrating isotope of the first count profile is Ru-136.

8. The method according to claim 1, in which the migrating isotope of the second count profile is Cs-137.

9. A system for analysing at least one nuclear fuel rod comprising a gamma-ray spectrometry device and a processing unit implementing the method according to claim 1.

10. A non-transitory computer program containing instructions for executing the method according to claim 1 when the program is executed by a processor.

\* \* \* \* \*